United States Patent [19]

Wen

[11] Patent Number: 5,431,256
[45] Date of Patent: Jul. 11, 1995

[54] ADJUSTING DEVICE FOR A BRAKE CABLE OF A BICYCLE

[76] Inventor: Chun T. Wen, No. 34, Lane 315, Min-Ju Road, Chan-Wha City, Chan-Wha Shien, Taiwan

[21] Appl. No.: 237,288

[22] Filed: May 3, 1994

[51] Int. Cl.$^6$ ............................................. B62L 1/06
[52] U.S. Cl. .......................... 188/24.19; 74/502.4; 74/502.6; 74/501.5 R; 188/2 D; 188/24.21; 188/196 M; 188/196 V; 403/303
[58] Field of Search ................ 188/2 D, 24.19, 24.11, 188/24.12, 24.14, 24.15, 24.16, 24.21, 24.22, 196 M, 196 V, 196 R; 74/501.5 R, 502.6, 502.5, 502.4, 500.5, 502; 403/303, 300, 301, 304, 305, 306, 308; 192/111 A

[56] References Cited

U.S. PATENT DOCUMENTS

| | | | |
|---|---|---|---|
| 698,127 | 4/1902 | Mitchell | 403/303 |
| 1,455,993 | 5/1923 | Conway | 403/308 X |
| 1,480,253 | 1/1924 | Fisher | 403/303 X |
| 2,041,385 | 5/1936 | Van Laanen, Jr. | 74/502.6 |
| 2,128,832 | 8/1938 | Lusher | 403/303 |
| 2,160,181 | 5/1939 | Taylor | 188/24.19 |
| 2,210,096 | 8/1940 | Pennell | 403/303 |
| 2,509,272 | 5/1950 | Karnuth et al | 74/502.6 X |
| 3,276,799 | 10/1966 | Moore et al. | 74/502.4 X |
| 3,920,340 | 11/1975 | Jones et al. | 74/502.4 X |
| 3,938,405 | 2/1976 | Sommerer | 74/502.4 |
| 4,023,653 | 5/1977 | Yoshigai | 188/2 D X |
| 4,057,127 | 11/1977 | Woodring | 188/24.16 |
| 4,407,167 | 10/1983 | Koukal et al. | 74/502.6 |
| 4,480,720 | 11/1984 | Shimano | 188/2 D |
| 4,552,251 | 11/1985 | Schoch | 188/24.22 X |
| 4,770,435 | 9/1988 | Cristie | 188/24.22 |
| 4,773,510 | 9/1988 | Sato | 188/24.16 |
| 4,811,620 | 3/1989 | Old et al. | 188/24.16 |
| 4,862,999 | 9/1989 | Rakover | 188/24.19 X |
| 4,877,112 | 10/1989 | Malinowski | 188/24.22 |
| 4,896,750 | 1/1990 | Tseng | 188/24.19 |
| 5,060,534 | 10/1991 | Yoshigai | 188/24.12 |
| 5,215,167 | 6/1993 | Davidson | 188/24.19 |
| 5,246,303 | 9/1993 | Trilla et al. | 74/502.4 |

FOREIGN PATENT DOCUMENTS

| | | | |
|---|---|---|---|
| 0547795 | 6/1993 | European Pat. Off. | 188/24.16 |
| 558051 | 8/1923 | France | 188/24.12 |
| 1007158 | 5/1952 | France | 188/24.22 |
| 87047 | 4/1966 | France | 188/24.12 |
| 516790 | 1/1993 | Japan | 188/2 D |
| 558375 | 3/1993 | Japan | 188/24.21 |
| 500024 | 2/1939 | United Kingdom | 188/24.21 |
| 2123501 | 2/1984 | United Kingdom | 188/24.16 |
| 2153460 | 8/1985 | United Kingdom | 188/24.16 |

*Primary Examiner*—Douglas C. Butler

[57] ABSTRACT

An adjusting device for a brake cable of a bicycle includes an adjusting element with a threaded hole defined in an end thereof, a first cable and a second cable. The first cable has a first end pivotally engaged to a connector and a second end with a head part which is rotatably engaged to the other end of the adjusting element. The second cable has a first end with a threaded portion which is engaged to the adjusting element by threading to a threaded hole defined therein and a second end, has a head part which is pivotally engaged to one end of a brake arm. The second cable is adjusted by rotating the adjusting element.

2 Claims, 4 Drawing Sheets

ADJUSTING DEVICE FOR A BRAKE CABLE OF A BICYCLE

BACKGROUND OF THE INVENTION

The present invention relates to an adjusting device and, more particularly, to an adjusting device for adjusting a tightness of a brake cable of a bicycle.

A conventional brake assembly of a bicycle, shown in FIG. 1, includes a first cable 54, a connector 53, a second cable 52 and two braking arms 50, 50 each with a brake rubber 501 disposed thereon. The first cable 54 has one end connected to a brake lever (figure not shown), and the other end, connected to the connector 15 by a bolt 531, the connector has a recess defined by two extending lugs 532, 532 for receiving the second cable 52 therein. The second cable 52 has two ends, each of which is fixedly engaged to an end of the brake arm 50, the other end of the brake arm 50 is pivotally engaged to a front fork 60 of the bicycle. The brake rubber 501 is disposed between the two ends of the brake arm 50 and extends toward to a wheel 70 of the bicycle. The first cable 54 is pulled upward by a user to pull the brake lever mentioned above, the connector 53 and the second cable 52 is then pulled upward too. The two brake arms 50, 50 are rotated about the respective pivotal ends thereof by an action of the second cable 52 and the brake rubbers 501, 501 clip the wheel 70 to stop the bicycle.

However, the second cable 52 tends to loose after using a period of time, and an adjustment of the second cable is not an easy job for a regular user. The user has to screw the bolt 51 with one hand and pull the second cable 52 with the other hand, that is not an easy job. Furthermore, the user has to check a balance between the two brake arms 50, 50 during the adjustment therebetween because the two brake arms 50, 50 are connected by a single second cable 52.

The present invention intends to provide a simple but effective device for adjusting a tightness of a braking cable to mitigate and/or obviate the above-mentioned problems.

SUMMARY OF THE INVENTION

The present invention provides an adjusting device for a brake cable of a bicycle includes an adjusting element with a threaded hole defined in an end thereof, a first cable and a second cable. The first cable has a first end pivotally engaged to a connector and a second end with a head part which is rotatably engaged to the other end of the adjusting element. The second cable has a first end with a threaded portion which is engaged to the adjusting element by threading to a threaded hole defined therein and a second end, has a head part which is pivotally engaged to one end of a brake arm. The second cable is adjusted by rotating the adjusting element.

It is an object of the present invention to provide an adjusting device for a brake cable of a bicycle, the brake cable is adjusted by rotating an adjusting element and needs no tools.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
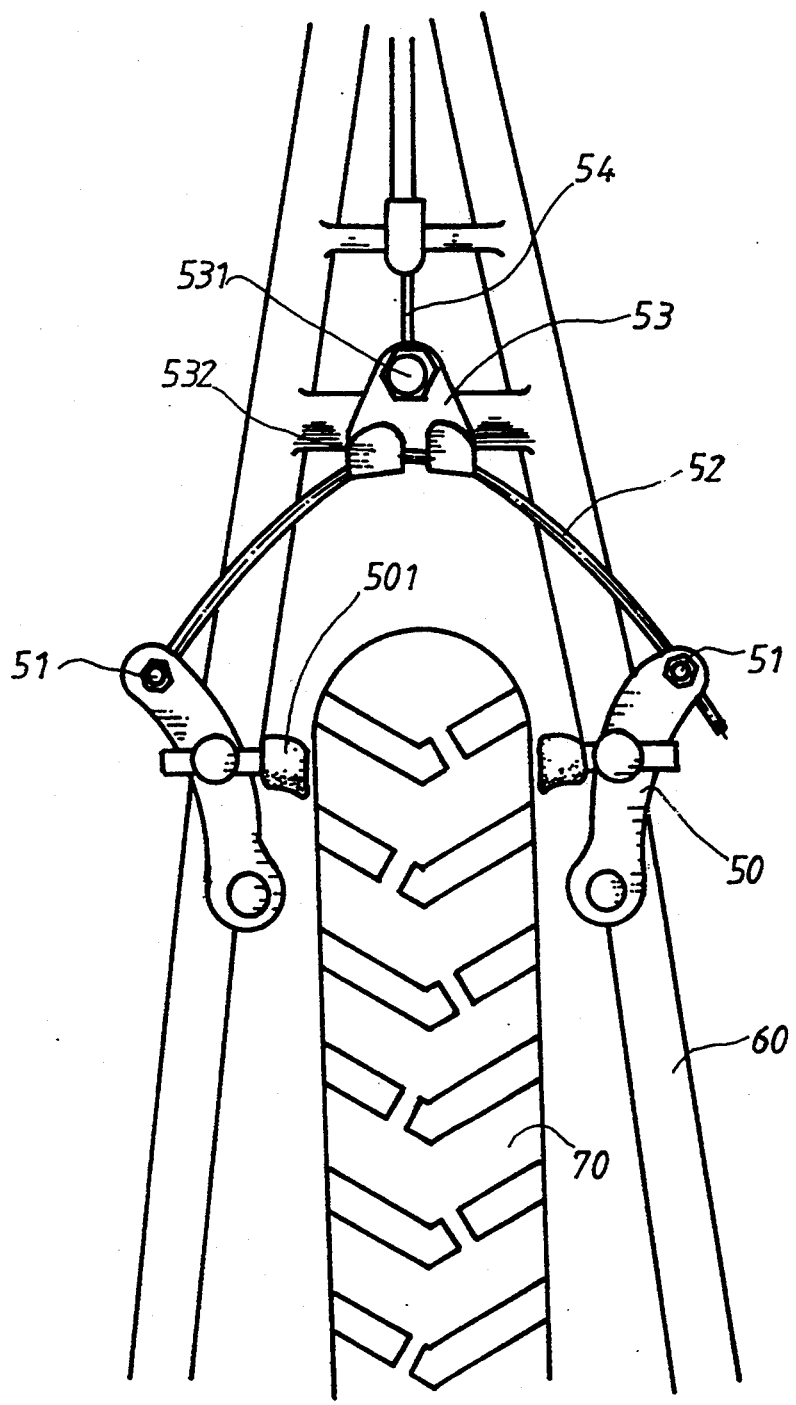
FIG. 1 is a side elevational view of a conventional brake assembly.
Figure 2:
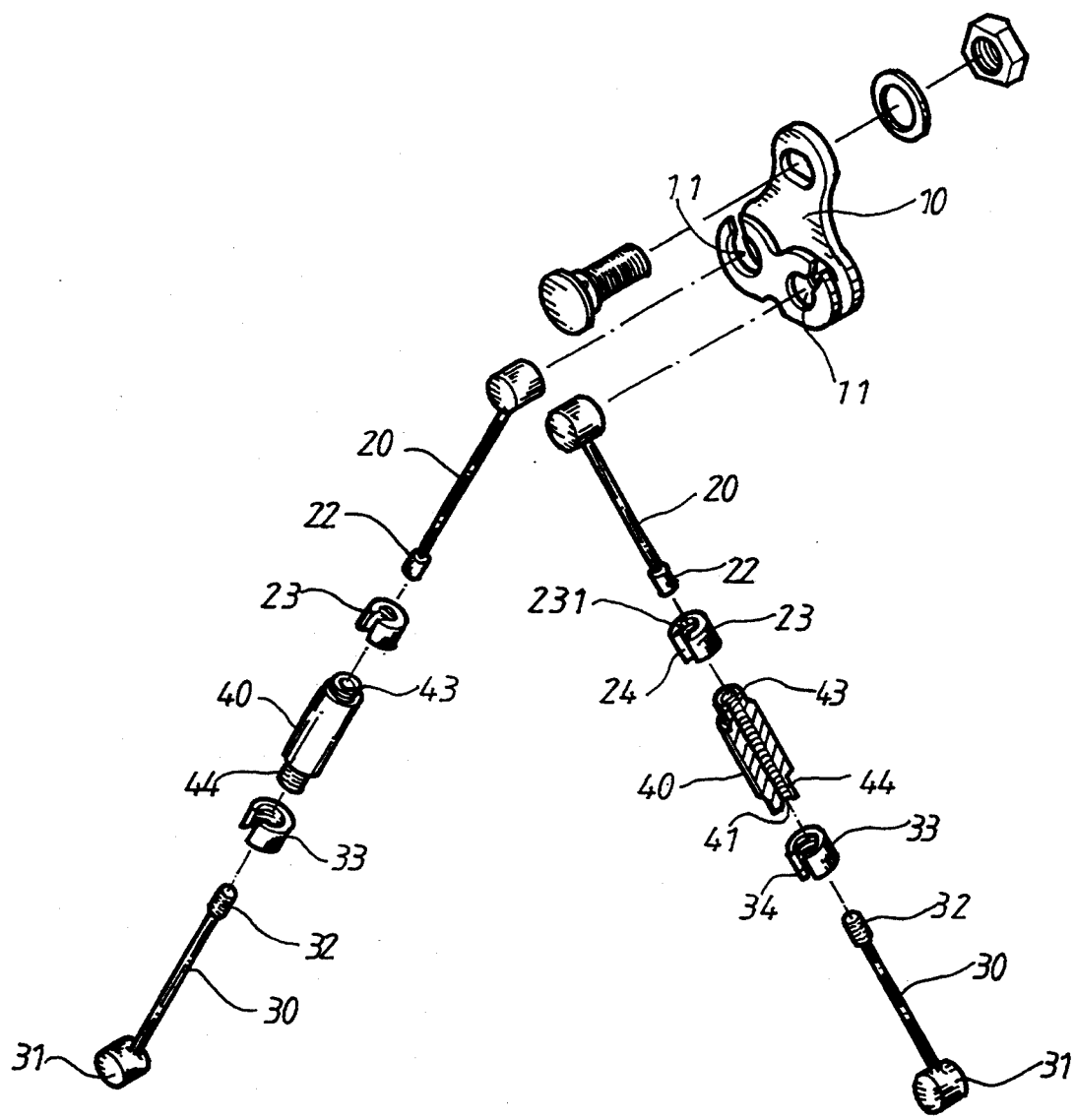
FIG. 2 is an exploded view of an adjusting device in accordance with the present invention.
Figure 3:
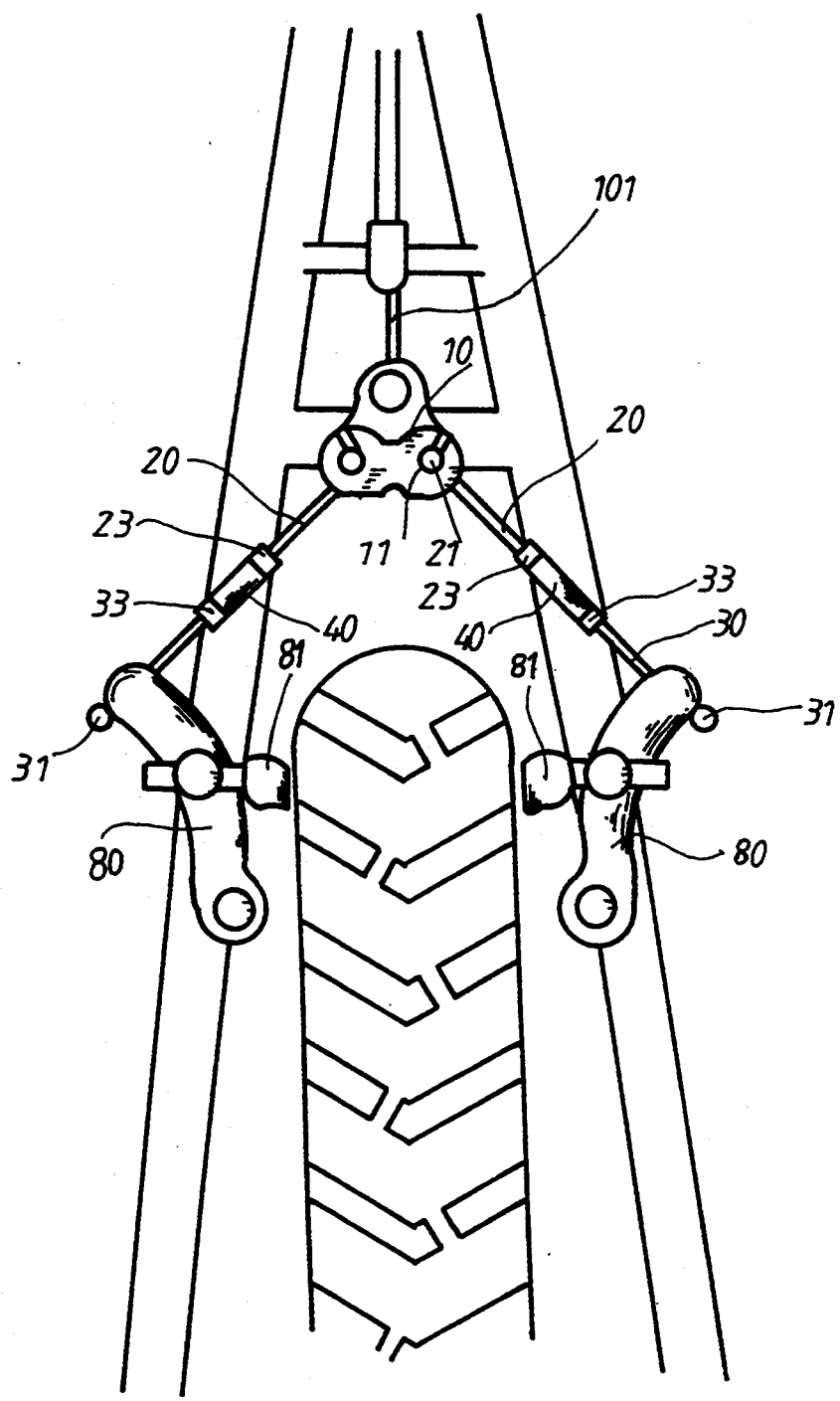
FIG. 3 is a side elevational view, partly in section, of the adjusting device in accordance with the present invention.

Referring to the drawings and initially to FIGS. 2 and 3, a brake assembly generally includes a main cable 101, a connector 10 and two brake arms 80, 80 on which a brake rubber 81 is disposed respectively. An adjusting device in accordance with the present invention includes a first cable 20, a second cable 30 and an adjusting element including a cylindrical body 40, a first nut 23 and a second nut 33.

Figure 4:
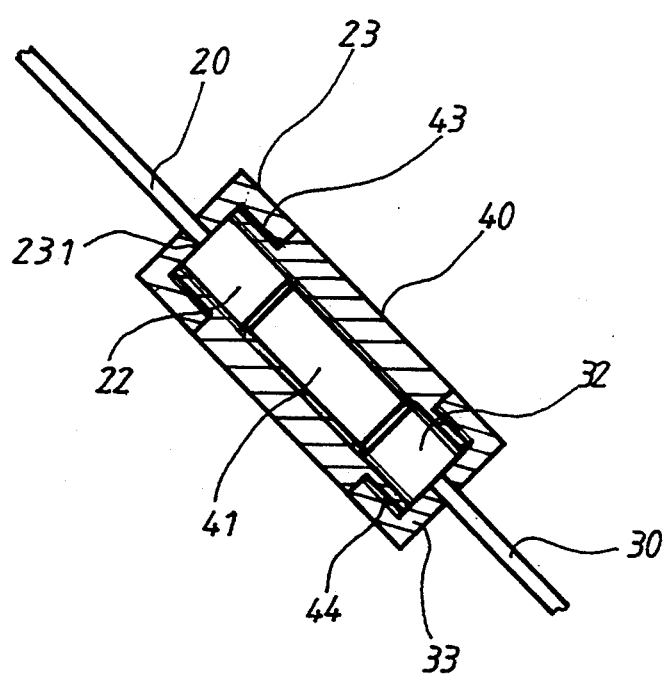
FIG. 4 is a side elevational view, partly in section, of an engagement of a cylindrical body, a first nut, a second nut, a first cable and a second cable in accordance with the present invention.

The first cable 20 has a first end pivotally engaged to a hole 11 of the connector 10 and a second end with a head part 22 formed thereon which is slidably engaged to the adjusting element. The second cable 30 has a first end with a threaded portion 32 disposed thereon and a second end, has a head part 31 which is pivotally engaged to one end of a brake arm 80. The cylindrical body 40 has two threaded projections 43, 44 projecting from each end thereof and a threaded hole 41 is defined in the projection 44 for engagement with the threaded portion 32 of the second cable 30. The first nut 23 has a slot 24 defined in a periphery thereof and communicates with an interior of the nut 23, a hole 231 with a diameter smaller than a diameter of the head part 22 of the first cable 20 is defined in an end of the first nut 23. The second nut 33 has a slot 34 defined in a periphery thereof and also communicates to an interior of the second nut 33. The head part 22 of the first cable 20 is received in the interior of the first nut 23 by inserting the first cable 20 through the slot 24 and is restrained by the smaller hole 231 of the first nut 23 which is then engaged to the projection 43 of the body 40 (see FIG. 4). The second cable 30 is received in the second nut 33 via the slot 34 and the threaded portion 32 is engaged to the threaded hole 41 of the second projection 44 to which the second nut 33 is engaged.

When adjusting the second cable 30, a user needs only to rotate the cylindrical body 40, the second cable 30 can be adjusted because of a threading relationship between the threaded portion 32 and the threaded hole 41 and there is no tool needed during the adjusting process.

Accordingly, the present invention provides a convenient feature for a user to adjust the second cable 30 needs no tools. Furthermore, the user adjusts needs not to worry about a balance of the two brake arms 80, 80 and this facilitates the adjusting action.

Although the invention has been explained in relation to its preferred embodiment, it is to be understood that many other possible modifications and variations can be made without departing from the spirit and scope of the invention as hereinafter claimed.

I claim:

1. An adjusting device for a brake cable of a bicycle, comprising:

a first cable having first end pivotally engaged to a connector and a second end, having a head part;

a second cable having a first end with a threaded portion and a second end, having a head part pivotally engaged to one end of a brake arm;

an adjusting element having first and second ends, a slot being defined in a periphery of said first end of said adjusting element for receiving said head part of said first cable therein via said slot, said second end of said adjusting element having a threaded hole for engaging to said threaded portion such that said second cable can be adjusted by rotating said adjusting element.

2. The adjusting device as claimed in claim 1 wherein said adjusting element includes a body having a first end and a second end, a first nut and a second nut, said body has a threaded projection projecting from each of said first end and said second end thereof for engagement with said first and said second nuts respectively, each of said first nut and said second nut has a slot defined in a periphery thereof respectively, a hole with a diameter smaller than a diameter of said head part of said first cable is defined in an end of said first nut for restraining said head part of said first cable from disengaging thereby.

* * * * *